(12) United States Patent
    Combe

(10) Patent No.: US 10,755,544 B2
(45) Date of Patent: Aug. 25, 2020

(54) AUTOMATIC SMOKE/CARBON MONOXIDE EVACUATION POWER SWITCH METHOD AND SYSTEM

(71) Applicant: CoEvac, LLC, Southlake, TX (US)

(72) Inventor: Dan Combe, Southlake, TX (US)

(73) Assignee: CoEvac, LLC, Southlake, TX (US)

( * ) Notice: Subject to any disclaimer, the term of this patent is extended or adjusted under 35 U.S.C. 154(b) by 0 days.

(21) Appl. No.: 16/268,489

(22) Filed: Feb. 5, 2019

(65) Prior Publication Data

US 2019/0172333 A1  Jun. 6, 2019

Related U.S. Application Data

(63) Continuation-in-part of application No. 15/629,808, filed on Jun. 22, 2017, and a continuation-in-part of application No. 15/629,815, filed on Jun. 22, 2017.

(60) Provisional application No. 62/474,054, filed on Mar. 20, 2017, provisional application No. 62/472,425, filed on Mar. 16, 2017.

(51) Int. Cl.
    *G08B 17/117*  (2006.01)
    *G08B 1/08*    (2006.01)
    *F02D 41/22*   (2006.01)
    *H04L 12/28*   (2006.01)
    *G08B 21/16*   (2006.01)
    *G05B 23/02*   (2006.01)

(52) U.S. Cl.
    CPC ........... *G08B 17/117* (2013.01); *F02D 41/22* (2013.01); *G08B 1/08* (2013.01); *G08B 21/16* (2013.01); *H04L 12/2823* (2013.01); *G05B 23/027* (2013.01)

(58) Field of Classification Search
    CPC ........ G08B 17/117; G08B 1/08; G08B 21/16; G05B 23/027; H04L 12/2823; F02D 41/22
    See application file for complete search history.

(56) References Cited

U.S. PATENT DOCUMENTS

| 2005/0078003 A1* | 4/2005 | King | G08B 17/10 |
| 2016/0019769 A1* | 1/2016 | Mumey | G08B 21/14 340/632 |

* cited by examiner

*Primary Examiner* — Ryan W Sherwin
(74) *Attorney, Agent, or Firm* — Wei Wei Jeang; Grable Martin Fulton PLLC

(57) ABSTRACT

An automatic smoke/carbon monoxide detection system and method are described that are configured to automatically shut off power supplied to an appliance/equipment, a room of a structure, a zone within a structure, or an entire structure upon detection of smoke/carbon monoxide/hazardous gases. A system and method are further described herein that are configured to connect to an on-board diagnostic port, where upon detection of smoke/carbon monoxide/hazardous gases exceeding a certain level, an alert is displayed/sounded so that the driver/passenger of the vehicle can act appropriately. Alternatively, a command may be issued to shut off the engine of the vehicle to immediately halt the production of deadly gases.

8 Claims, 10 Drawing Sheets

AUTOMATIC SMOKE/CARBON MONOXIDE EVACUATION POWER SWITCH METHOD AND SYSTEM

RELATED APPLICATIONS

The present application is a continuation-in-part application of co-pending U.S. Non-Provisional patent application Ser. No. 15/629,808 filed Jun. 22, 2017, entitled Automatic Smoke/Carbon Monoxide Evacuation Method and System for a Garage, and co-pending U.S. Non-Provisional patent application Ser. No. 15/629,815 filed Jun. 22, 2017, entitled Automatic Smoke/Carbon Monoxide Evacuation Method and System, both of which claim the benefit of U.S. Provisional Patent Application No. 62/474,054 filed Mar. 20, 2017 and U.S. Provisional Patent Application No. 62/472,425 filed Mar. 16, 2017, all of which are incorporated herein by reference.

FIELD

The present disclosure primarily relates to an automatic smoke and carbon monoxide evacuation method and system for a building or structure.

BACKGROUND

Statistics show thousands of people die from residential fires and smoke inhalation every year in the United States. In fact, most fire deaths are not caused by burns, but by inhaling deadly smoke and fumes generated by the fire. The synthetic materials that are common in today's homes produce a toxic stew of lethal gases that can be deadly even in small quantities. The combination of reduced oxygen and the presence of toxic smoke can quickly obscure escape routes and incapacitate occupants so that they become unconscious and cannot exit the building. In typical situations, smoke from a fire is detected by conventional smoke detectors which sound alarms, but the smoke is retained inside the home until the fire burns through the rooftop. By then, the integrity of the building or structure is compromised and the building is in danger of collapse. Existing air-handling systems merely recirculate the smoke and do not evacuate the smoke. Therefore, critical time passes as smoke accumulates inside the building, creating a deadly hazard for the occupants. Without immediate rescue efforts, occupants often fatally succumb to the smoke.

Another silent killer inside the home is carbon monoxide (CO). A typical home is typically outfitted with many appliances and equipment that burn carbon-based fuels such as natural gas and emit carbon monoxide as a byproduct. For one reason or another, this odorless and colorless gas can be inadvertently retained inside the home rather than properly exhausted outside the home. Because the symptoms of carbon monoxide poisoning mimic those of the flu, early signs of carbon monoxide exposure are often overlooked or dismissed. Carbon monoxide's deadly effects are fast-acting, and people who are asleep or intoxicated are especially vulnerable. The CDC estimates that an average of 430 people die from unintentional carbon monoxide exposure in the United States every year. About 3000 people are treated each year for unintentional non-fire related carbon monoxide exposure. Even healthy people who survive exposure to high levels of carbon monoxide can be left with permanent heart or brain damage. Tragically, people also commit suicide by carbon monoxide poisoning using automobile exhaust. Many such cases of suicide by carbon monoxide poisoning have resulted in the collateral killing of family members, who have been inside homes when the excess carbon monoxide from a running vehicle continues to fill a residence. More recently, cases of inadvertent carbon monoxide deaths arise from cars equipped with keyless ignition accidentally left running in the garage. Occupants of a building or structure, if still awake or conscious, can heed the alarm of a carbon monoxide detector, but these devices do nothing to alleviate the dangerous condition.

With these statistics, it's evident that current measures to prevent smoke inhalation and carbon monoxide poisoning are insufficient. Current homes and other structures do not have an automatic way to address the presence of smoke and carbon monoxide.

DETAILED DESCRIPTION

A primary goal of the various embodiments of the present system and method is to automatically and actively ventilate smoke, carbon monoxide (hereinafter referred to as smoke/carbon monoxide), and other hazardous gases outside a building or structure upon detection by using existing evacuation pathways already present in the building or structure or by minimally retrofitting ventilation pathways. These existing pathways include existing exhaust ducts of internal ventilation fans, vent hood, clothes dryer, water heater, furnace, etc. that allow exhaust air from the combustible fuel-burning equipment/appliances, bathroom, kitchen, laundry room, basement, etc. to be efficiently vented to the outside. In the case of a fire, the expedient venting of smoke to the outside allows the neighbors and the general public to observe the smoke and alert the authorities. In another embodiment, the present system and method utilizes existing garage door openers to automatically open the garage door upon detection of smoke/carbon monoxide in the garage to create a pathway for the toxic gases to escape. A further goal is to automatically cut off the power supply to certain appliances and equipment, such as HVAC, water heaters, cooktops, ranges, ovens, dryers, dishwashers, boilers, etc., upon detection of smoke, CO, and other hazardous gases. Exterior audible and/or visual alarms may be used to alert neighbors and the general public. When remote monitoring is available, an alert may be transmitted to enable notification of firefighting and law enforcement authorities. In all cases, the automatic and active venting of dangerous smoke/carbon monoxide will save countless lives.

Figure 1:
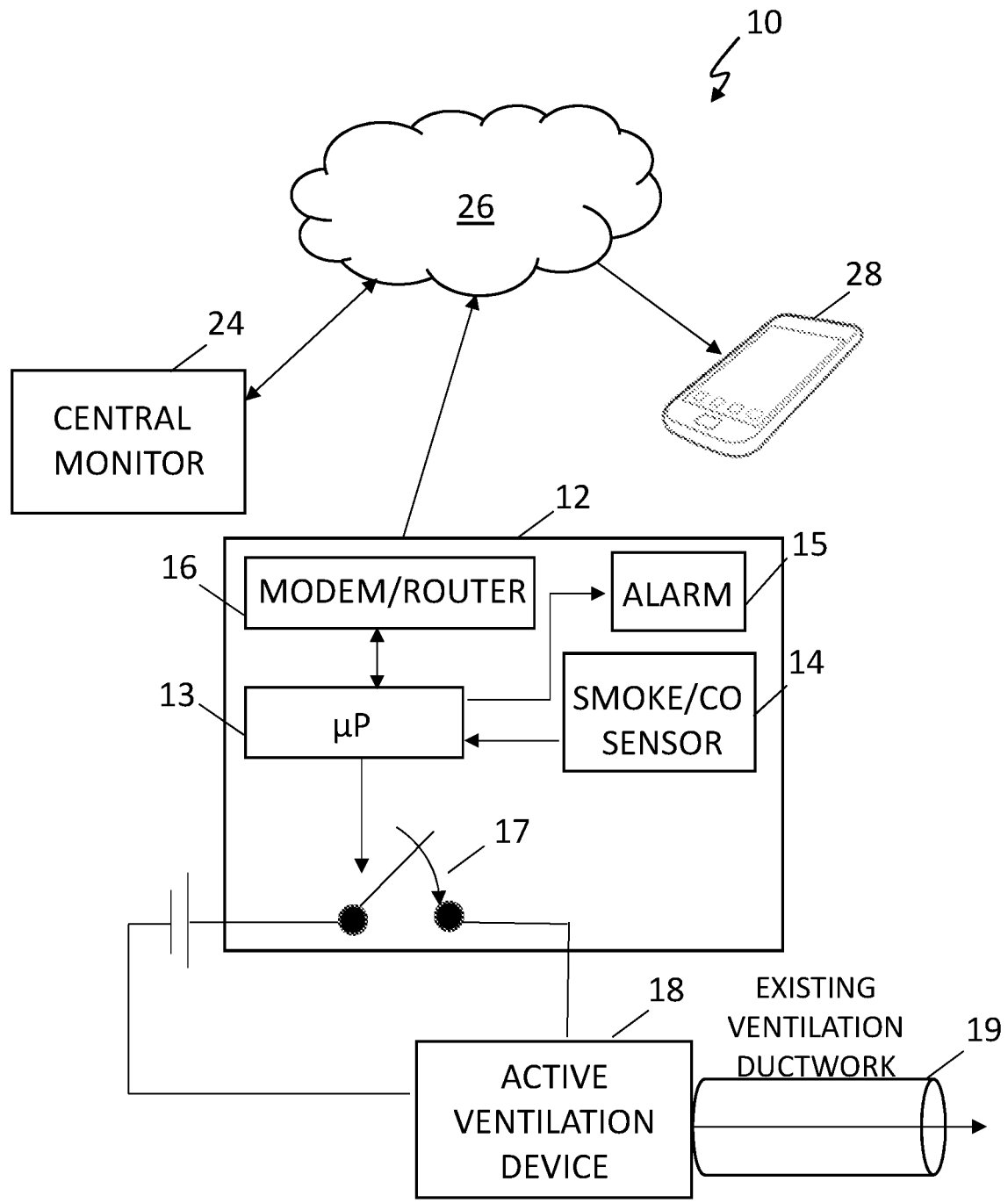
FIG. 1 is a simplified block diagram of an exemplary embodiment of an automatic smoke and carbon monoxide evacuation system according to the teachings of the present disclosure.

FIG. 1 is a simplified block diagram of an exemplary embodiment of an automatic smoke and carbon monoxide evacuation system 10 according to the teachings of the present disclosure. The components of the system 10 include a smoke/carbon monoxide activated switch 12, that includes a microprocessor 13 in communication with a smoke/carbon monoxide sensor 14, an audible/visual alarm 15, and a wireless (or wired) modem/router/transceiver (using WiFi, cellular, Bluetooth, Zigbee or another wireless technology) 16. The smoke/carbon monoxide activated switch 12 further includes a power switch 17, which is coupled to one or more fixed or variable speed ventilation devices or blowing fans 18, which ventilate air via existing or retrofitted ductwork of the building that form ventilation/exhaust passageways 19 to the outside.

In operation, the smoke/carbon monoxide activated switch 12 preferably includes a combined smoke and carbon monoxide sensor 14 that incorporate technology for detecting both the presence of smoke and carbon monoxide in the environment as known in the art or to be developed in the future. Alternatively, the sensor 14 may be dedicated to detecting only one type of hazardous substance, such as smoke, carbon monoxide, radon, etc. A home can incorporate a combination of different types of sensors strategically. Upon sensing the presence of smoke and/or carbon monoxide exceeding a predetermined level, the smoke/carbon monoxide sensor 14 automatically generates a trigger signal that is received by the microprocessor 13, which automatically causes the power switch 17 to close to provide power (AC or DC) to and activate the ventilation device(s), blower(s), or fan(s) 18. The operation of the ventilation device 18 causes the smoke/carbon monoxide detected in the environment to be automatically drawn in and actively evacuated to the outside via the existing ventilation ductwork 19. Additionally, the microprocessor 13 automatically causes the audible/visual alarm 15 to be set off to alert occupants in the building. A loud sound, recorded message, and/or strobe lights can be used. Alternatively, the recorded message and/or the strobe light can be programmed to indicate whether it is smoke or carbon monoxide that has been detected. For example, the strobe light may be red for smoke and blue for carbon monoxide. More sophisticated systems may additionally have the ability to provide more information, such as issuing an audible warning that gives the location of the problem, e.g., "Carbon monoxide detected in the kitchen, evacuate now!" Optionally, the system includes alarms located outside the building or structure (connected wired or wirelessly to the microprocessor 13) so that neighbors and the general public can be alerted of the emergency.

In the preferred embodiment, the smoke/carbon monoxide activated switch 12 can be used to replace or compliment a conventional switch used to control the operation of an existing ventilation fan, such as a wall-mounted flip or toggle switch. The power switch 17 can be manually manipulated to turn on the ventilation fan, as well as being controlled by the microprocessor 13 in response to the presence of harmful fumes in the environment detected by the smoke/carbon monoxide sensor 14. Retrofitted in this manner, most homes can be easily outfitted with this safety feature to automatically and actively vent deadly smoke and carbon monoxide to the outside.

Additionally, the microprocessor 13 may generate a signal that causes an audible and/or visible alarms 15 co-located (integrated) with and/or located remotely from the smoke/carbon monoxide activated switch 12 to produce an audible and/or visible alert to inform the occupants of the building or structure. Optionally, the microprocessor 13 may be in communication with a plurality of sensors and alarms and can notify one or more selected alarms in the building to issue a visual/audible alarm even if their respective associated sensors have not yet detected smoke/carbon monoxide. The alert can be a loud sound, siren, warning message, flashing lights, etc. that would capture the occupants' attention and instruct them to exit the building.

The smoke/carbon monoxide activated switch 12 may also include a wireless or wired modem/router/transceiver (using WiFi, cellular, Bluetooth, Zigbee or another wireless technology) 16 that may send data to a central monitor 24 via the Internet and/or telecommunication network 26 that may then relay the information to fire rescue and emergency response authorities. A mobile phone (or another type of mobile device) 28 with a downloaded app may be configured to automatically receive wireless notifications from the central monitor 24 or from the microprocessor 13 directly so that an alert can be communicated to a user via the mobile phone's interfaces (display, speaker, vibrator, etc.) depending on the user's preferences in the form of text messages, email, flashing display, vibration, or other forms of communication. The notification to the central monitor 24 and mobile devices 28 may include the location, e.g., basement, upstairs bedroom, garage, etc., where the smoke or carbon monoxide was detected. These notifications provide an added layer of safety alerts to users that may or may not be currently on-site at the time of the emergency.

For the most part, the disclosed method and system 10 preferably use existing ventilation/exhaust passageways 19 to evacuate the smoke/carbon monoxide. In particular, each potential source of carbon monoxide in the home (or another type of building or structure) is provided with an automatic smoke/carbon monoxide detection and evacuation strategy so that upon detection of the presence of smoke/carbon monoxide emitted by the equipment, the hazardous gas is automatically vented outside of the home/building/structure so that the danger is automatically alleviated or mitigated. In those combustible fuel-operated appliances or equipment where a blower motor (power vent motor, induced draft fan, ventilation fan, etc.) or another type of ventilation device is currently located, a carbon monoxide sensor and power relay switch 12 may be installed to automatically provide power in order to automatically force out smoke/carbon monoxide that is present, even when the appliance or equipment is in the OFF position. The sensor/switch combination device can replace an existing switch or power cord. Alternatively, an existing power outlet can be replaced with a sensor/switch combination outlet that can automatically cut off power upon detection of smoke/carbon monoxide. Sources of carbon monoxide gas in a home include: gas or oil burning furnaces, heaters, and boilers; gas water heaters (both tank and tank-less water heaters); gas and wood burning fireplaces; gas ranges, ovens, and cooktops; gas clothes dryers; wood stoves; power generators; motor vehicles; and power tools and lawn equipment.

Although not the focus of the present disclosure, the detection and automatic evacuation of other hazardous gaseous substances such as radon gas in the home is also contemplated herein. In this instance, a radon gas sensor is used to detect the presence of radon gas and automatically activate ventilation blowers and/or fans to evacuate the radon gas through existing or retrofitted ventilation ductwork. Alternatively, sensor 14 is capable of detecting the presence of smoke, carbon monoxide, radon gas, natural gas, and other harmful or combustible fumes and substances.

In an alternate embodiment, the smoke/carbon monoxide activated switches and sensors within a home or facility are all in wireless (or wired) communication with each other. The switches and sensors may also be in communication with a remote or on-site central controller that may coordinate the activation of one or more selected ventilation devices depending on the location of detected smoke/carbon monoxide so that the noxious gases can be optimally evacuated in the most efficient and expedient manner.

Figure 2:
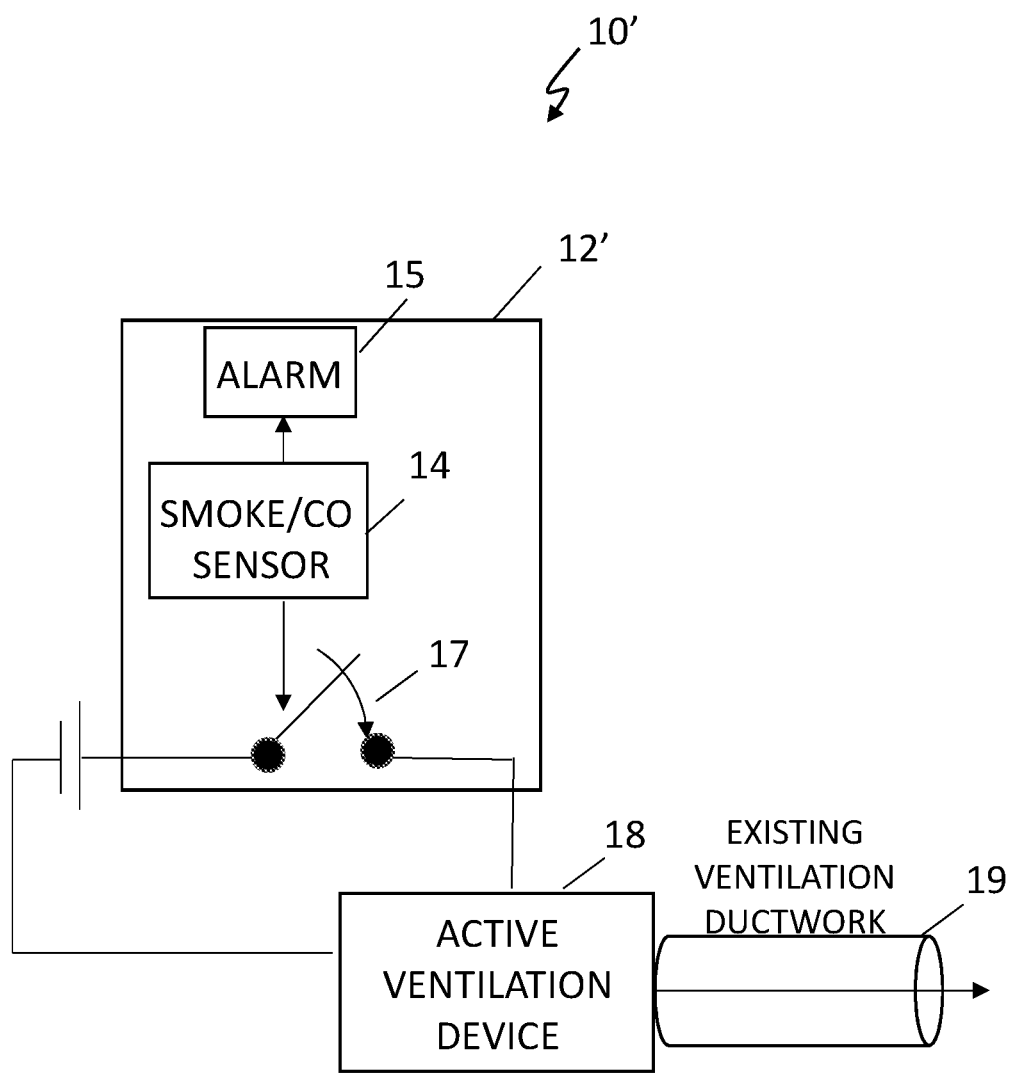
FIG. 2 is a simplified block diagram of another exemplary embodiment of an automatic smoke and carbon monoxide evacuation system according to the teachings of the present disclosure.

The carbon monoxide sensor, activation switch, fan, and alarm may be integrated into a single housing or they may be separate devices coupled to one another or in communication with one another. In one exemplary embodiment shown in FIG. 2, the smoke/carbon monoxide sensor 12' may be integrated with a wall-mounted toggle switch that is used to turn on/off an existing ventilation fan in a bathroom. Upon detection of smoke/carbon monoxide, the sensor 14 causes the power switch 17 to turn on the ventilation fan 18, which draws the smoke/carbon monoxide in and evacuates it via existing ductwork 19. In this embodiment, the only alteration needed to an existing ventilation fan setup is replacing the wall-mounted manual switch that controls the operation of the ventilation fan. A user may still use the wall-mounted manual switch to turn on and off the ventilation fan, but in the event of smoke/carbon monoxide detected in the environment, the manual setting of the switch would be overridden to turn on the ventilation fan to actively evacuate the toxic gases. In this manner, all existing ventilation fans, exhaust fans, and gas appliances in the home are retrofitted with automatic detection and evacuation mechanisms that automatically activate with the presence of smoke/carbon monoxide, in addition to sounding an alarm and/or flashing lights. This alternate embodiment omits the inclusion of the microprocessor and modem/router/transceiver if communication with a central monitor or mobile device is not required or desired. As in the other embodiment described above, the smoke/carbon monoxide sensor 14 causes the audible/visual alarm 15 to be set off to alert occupants inside the building, and optionally outside the building. The alarm 15 can be co-located or integrated with the smoke/carbon monoxide sensor 14 or be remotely located but in wired/wired communication with the sensor.

Figure 3:
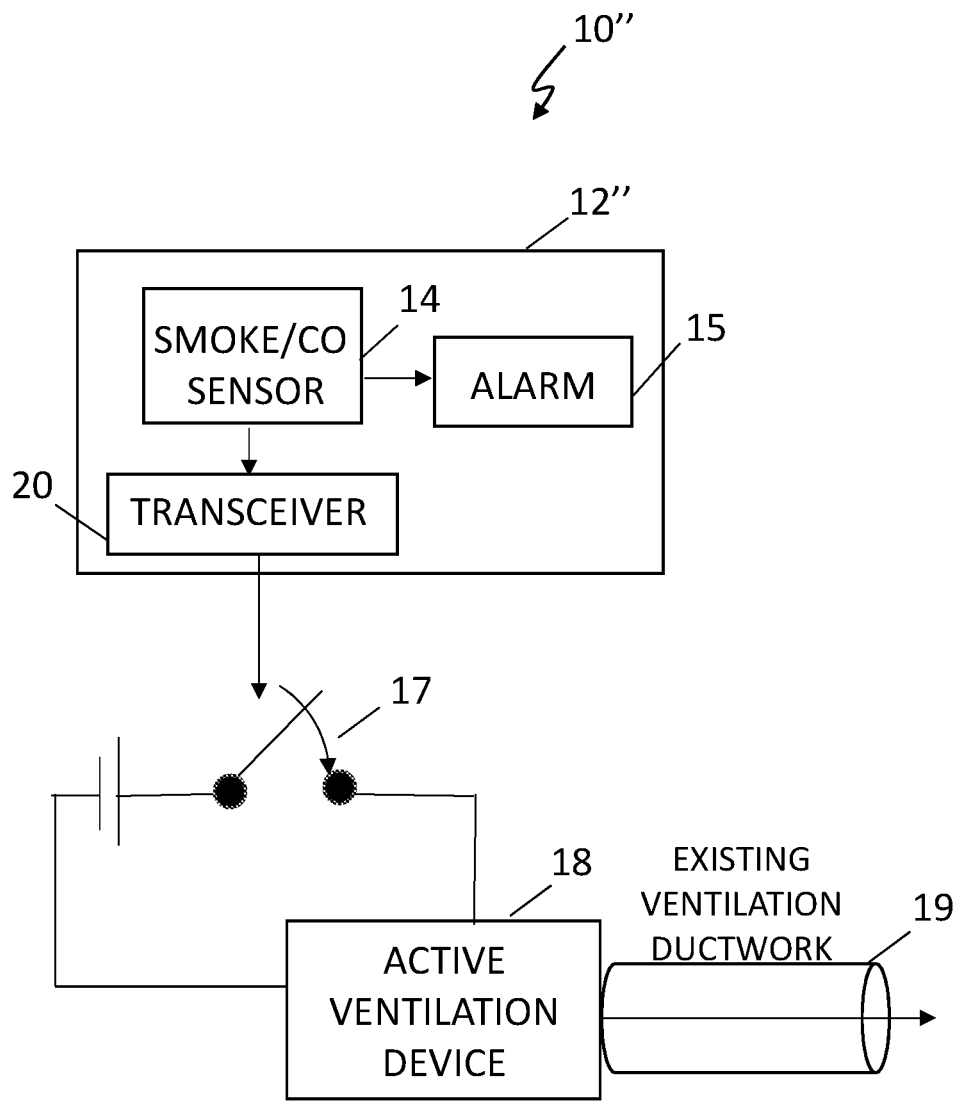
FIG. 3 is a simplified block diagram of yet another exemplary embodiment of an automatic smoke and carbon monoxide evacuation system according to the teachings of the present disclosure.

FIG. 3 is a simplified block diagram of yet another exemplary embodiment of an automatic smoke and carbon monoxide evacuation system 10" according to the teachings of the present disclosure. The system 10" includes a smoke/carbon monoxide sensor 14 that automatically generates a signal upon detection of smoke/carbon monoxide. The generated signal is received by a wireless (or wired) transceiver 20 that is in wireless communication with a power switch 17 associated with the active ventilation device 18. The transceiver 20 causes the power switch 17 to close, thus automatically activating the ventilation device 18 and vents the detected hazardous air outside the building via existing ductwork 19. At the same time, the smoke/carbon monoxide sensor 14 also automatically sends a signal to the alarm 15, which may be co-located or located remotely from the sensor, and causes it to generate an audible/visual alarm.

Figure 4:
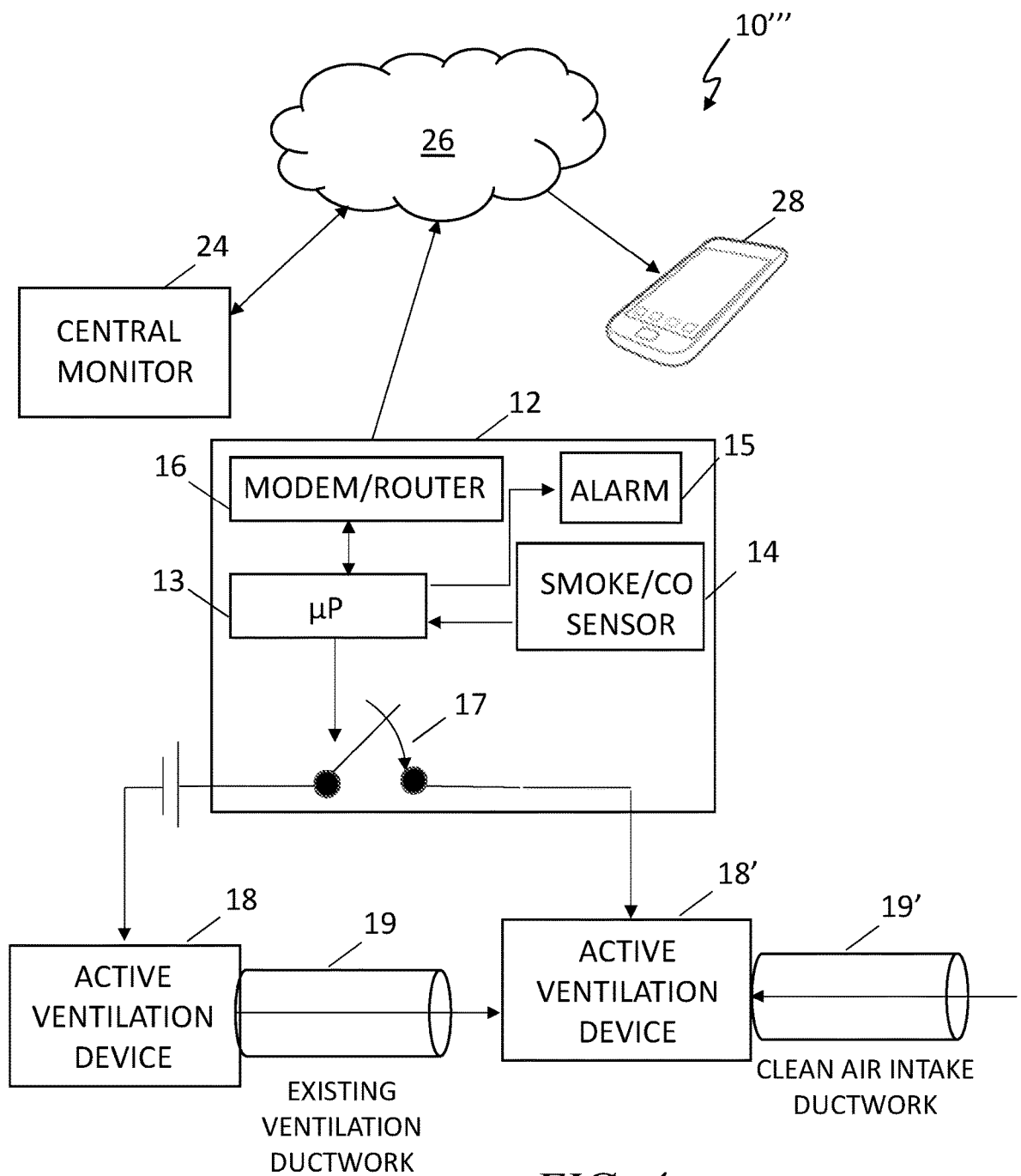
FIG. 4 is a simplified block diagram of another exemplary embodiment of an automatic smoke and carbon monoxide evacuation system automatically incorporating an air intake system according to the teachings of the present disclosure.

FIG. 4 is another simplified block diagram of an exemplary embodiment of an automatic smoke and carbon monoxide evacuation system 10''' according to the teachings of the present disclosure. The smoke/carbon monoxide activated switch 12 includes a smoke/carbon monoxide sensor 14, audible/visual alarm 15, and a wired/wireless modem/router/transceiver 16, which forms a connection with a power switch 17 for one or more fixed or variable speed ventilation devices or blowing fans 18 and 18'. Upon sensing the presence of smoke and/or carbon monoxide exceeding a predetermined level, the smoke/carbon monoxide sensor 14 automatically generates a signal that is received by the microprocessor 13, which automatically sends a wireless signal to close the power switch 17 and activate the ventilation device 18. The automatic operation of the ventilation devices 18 causes the smoke/carbon monoxide detected in the environment to be drawn in and actively evacuated to the outside via existing ventilation ductwork 19. Ideally, a properly insulated and constructed home should have combustible fuel-burning equipment and appliances isolated from the living spaces that people occupy so that the air between the two do not mix. However, many homes are not built with these considerations and may lack adequate mechanical ventilation to properly vent hazardous air and bring in fresh air. Accordingly, in addition to evacuating the harmful gases, the present disclosure also includes the automatic closure of the power switch 17 to further activate another set of ventilation device 18' that draws in clean outside air from the intake ductwork 19', as shown in FIG. 4. Adequately ventilated in this way, the activation of ventilation devices 18 to evacuate the harmful gases would not create a vacuum inside the home.

Figure 5:
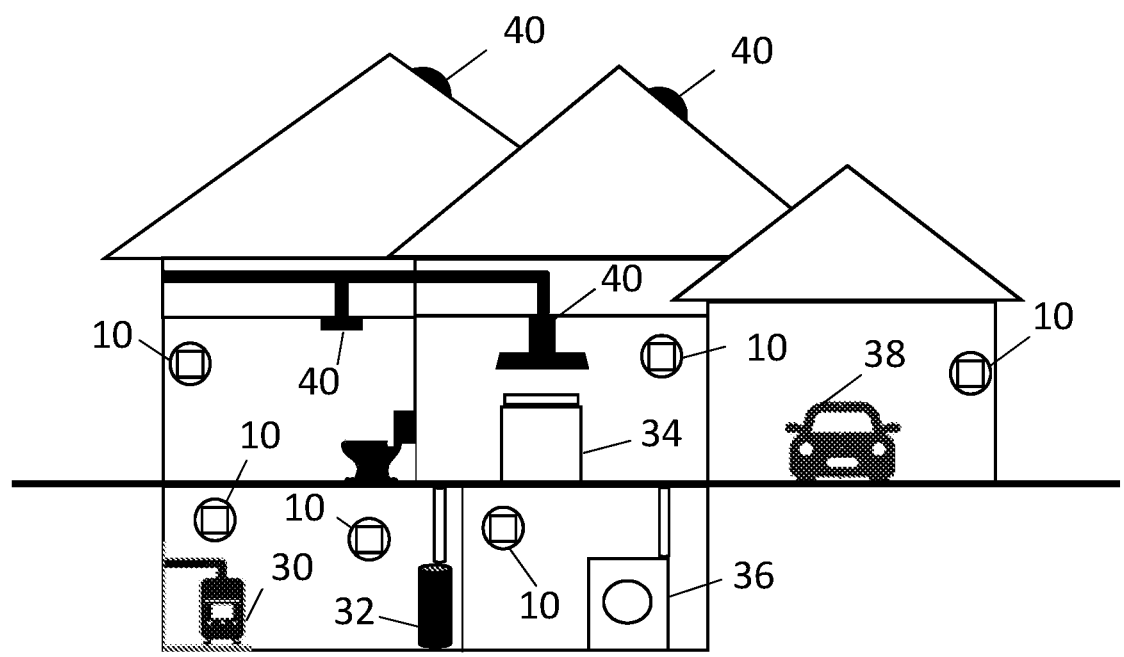
FIG. 5 is a diagram illustrating the architecture of a typical residential building in which automatic smoke and carbon monoxide evacuation system and method are deployed according to the teachings of the present disclosure.

FIG. 5 is a diagram illustrating the architecture of a typical residential building in which automatic smoke and carbon monoxide evacuation system and method 10 are deployed according to the teachings of the present disclosure. In a typical home, many rooms are already equipped with means of ventilation to the outside, such as kitchen, bathroom, laundry room, utility room, water heater closet, and basement. In the home, common sources of carbon monoxide gas include anything that burns a carbon-based fuel, for example, gas and oil furnaces 30, heaters, and boilers; gas and oil water heaters (both tank and tank-less water heaters) 32; gas and wood burning fireplaces; gas ranges, ovens, and cooktops 34; gas clothes dryers 36; wood stoves; and motor vehicles 38. According to the disclosure herein, the location of each carbon monoxide source incorporates a smoke/carbon monoxide evacuation strategy. As most of the carbon monoxide sources are already equipped with exhaust ductwork and ventilation fans 40, the system and method 10 of the present disclosure automatically activates one or more of the fans 40 in case of detected smoke/carbon monoxide.

For example, in the case of a gas stove or fireplace application, a smoke/carbon monoxide activated switch 12 is installed behind or near the inbound gas-supply, and is capable of automatically triggering and activating a fan (or increase the fan speed) to actively pull smoke/carbon monoxide from the area around the heat-shield, to the exterior of the building. Secondary lights and alarms may be automatically activated while the evacuation fan is operating and to alert occupants of the building and people outside the building that smoke/carbon monoxide/natural gas exceeds a predetermined concentration. Email, text message, or another form of electronic alert may also be automatically issued to one or more mobile devices to notify the users.

In the case of a combustible fuel dryer, a smoke/carbon monoxide activated switch 12 is located behind or near the inbound combustible fuel burner chamber, and is capable of automatically triggering a fan (or increase the fan speed) to actively pull smoke/carbon monoxide/natural gas from the area around the dryer, to the exterior of the structure. Secondary lights and alarms may be automatically activated while the evacuation fan is operating to alert occupants of the building that smoke/carbon monoxide/natural gas exceeds a predetermined concentration. Email, text message, or another form of electronic alert may also be automatically issued.

In the case of a gas water heater, a smoke/carbon monoxide activated switch 12 is located proximate the inbound gas-supply line and is capable of automatically triggering a fan (or increase the fan speed) at the outside wall to actively pull smoke/carbon monoxide/natural gas from the area around the water heater and evacuate it to the exterior of the structure via existing ductwork. Secondary lights and alarms may be automatically activated while the evacuation fan is operating and to alert occupants of the building that smoke/carbon monoxide/natural gas exceeds a predetermined concentration. Email, text message, or another form of electronic alert may also be automatically issued.

In the case of a gas fireplace, a smoke/carbon monoxide activated switch 12 is located within 24 inches of the inbound gas-supply line at the gas starter access, and is capable of triggering a fan (or increase the fan speed) to actively pull smoke/carbon monoxide/natural gas to the exterior of the structure through vents, or the chimney above the fireplace. Secondary lights and alarms may be activated while the sensor is tripped and evacuation fans/pumps are operating and to alert occupants of the building that smoke/carbon monoxide/natural gas exceeds a predetermined concentration. Email, text message, or another form of electronic alert may also be issued.

In the case of a combustible furnace application, a smoke/carbon monoxide activated switch 12 is located within 16 inches of the inbound gas-supply line at the exterior of the appliance, and is capable of triggering a fan or blower (or increase the fan speed) to actively pull carbon monoxide etc. to the exterior of the structure through an existing flue gas out vent or chimney. Secondary lights and alarms may be activated while the sensor is tripped and evacuation fans/pumps are operating and to alert occupants of the building that smoke/carbon monoxide/natural gas exceeds a predetermined concentration. Email, text message, or another form of electronic alert may also be issued.

In the case of a gas stove or oven application, a smoke/carbon monoxide activated switch 12 is located near the inbound gas-supply line or near the ventilation hood, and is capable of triggering the fan (or increase the fan speed) in the ventilation hood to actively pull carbon monoxide etc. to the exterior of the structure through an existing flue gas out vent or chimney. Secondary lights and alarms may be activated while the sensor is tripped and evacuation fans/pumps are operating and to alert occupants of the building that smoke/carbon monoxide/natural gas exceeds a predetermined concentration. Email, text message, or another form of electronic alert may also be issued.

In the preferred embodiment of the present disclosure, a ventilation fan may be installed in an existing ventilation passageway if none existed previously. Further, new ductwork may be added to create a ventilation passageway for a particular carbon monoxide source if none existed previously. Further, the smoke/carbon monoxide sensor may additionally activate mechanical intake of clean air for certain applications.

Figure 6:
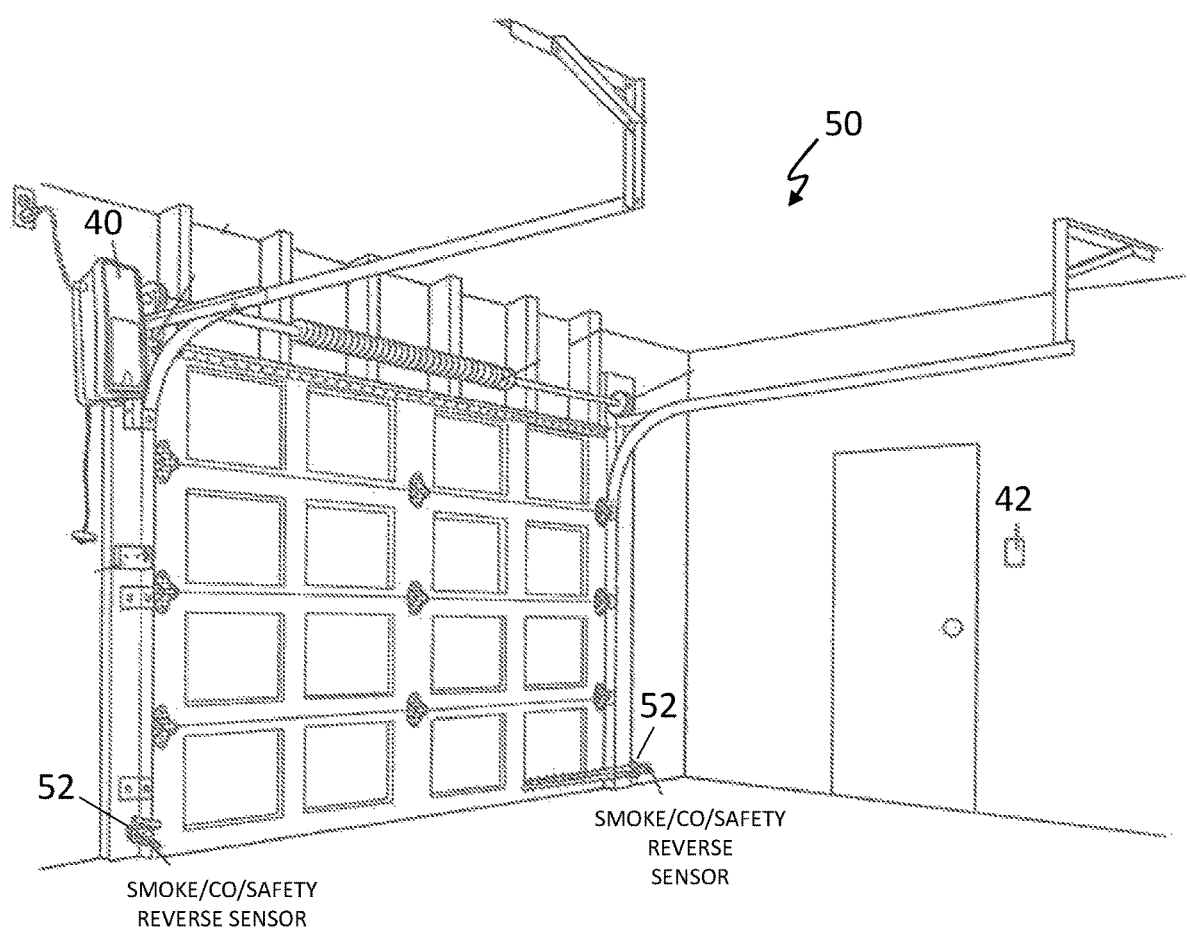
FIG. 6 is a diagram illustrating another exemplary embodiment of an automatic smoke and carbon monoxide evacuation system according to the teachings of the present disclosure.

FIG. 6 is a diagram illustrating another exemplary embodiment of an automatic smoke and carbon monoxide evacuation system 50 according to the teachings of the present disclosure. A source of carbon monoxide inside the home is the automobile that is parked inside the garage that can intentionally or inadvertently cause unnecessary death and injury. The garage is typically equipped with an automated garage door opener with a motor unit 40 (wall-mounted or ceiling-mounted) that can be operated from a remote controller (not shown) or wall-mounted controller 42. The garage door is divided into horizontal sections that have rollers running on a set of tracks. The motor unit 40 is configured to raise and lower the garage door along these tracks. Garage door openers manufactured for the U.S. since 1993 are required to include a safety feature that includes sensors located near the floor on two sides of the garage door that can detect the presence of an object in the path of a closing garage door. In response to detecting an obstruction, the safety sensors cause the motor unit 40 of the garage door to reverses direction and retract the door so that it stays open. These safety sensors are activated to reverse the direction of the garage door when a projected beam across the path of the closing garage door is obstructed by an object. In a preferred embodiment of the present disclosure, a smoke/carbon monoxide activated switch 52 is co-located or integrated with the safety reverse sensors of the garage door opener to automatically open the garage door and keep it open when a predetermined concentration of smoke/carbon monoxide is detected.

Figure 7:
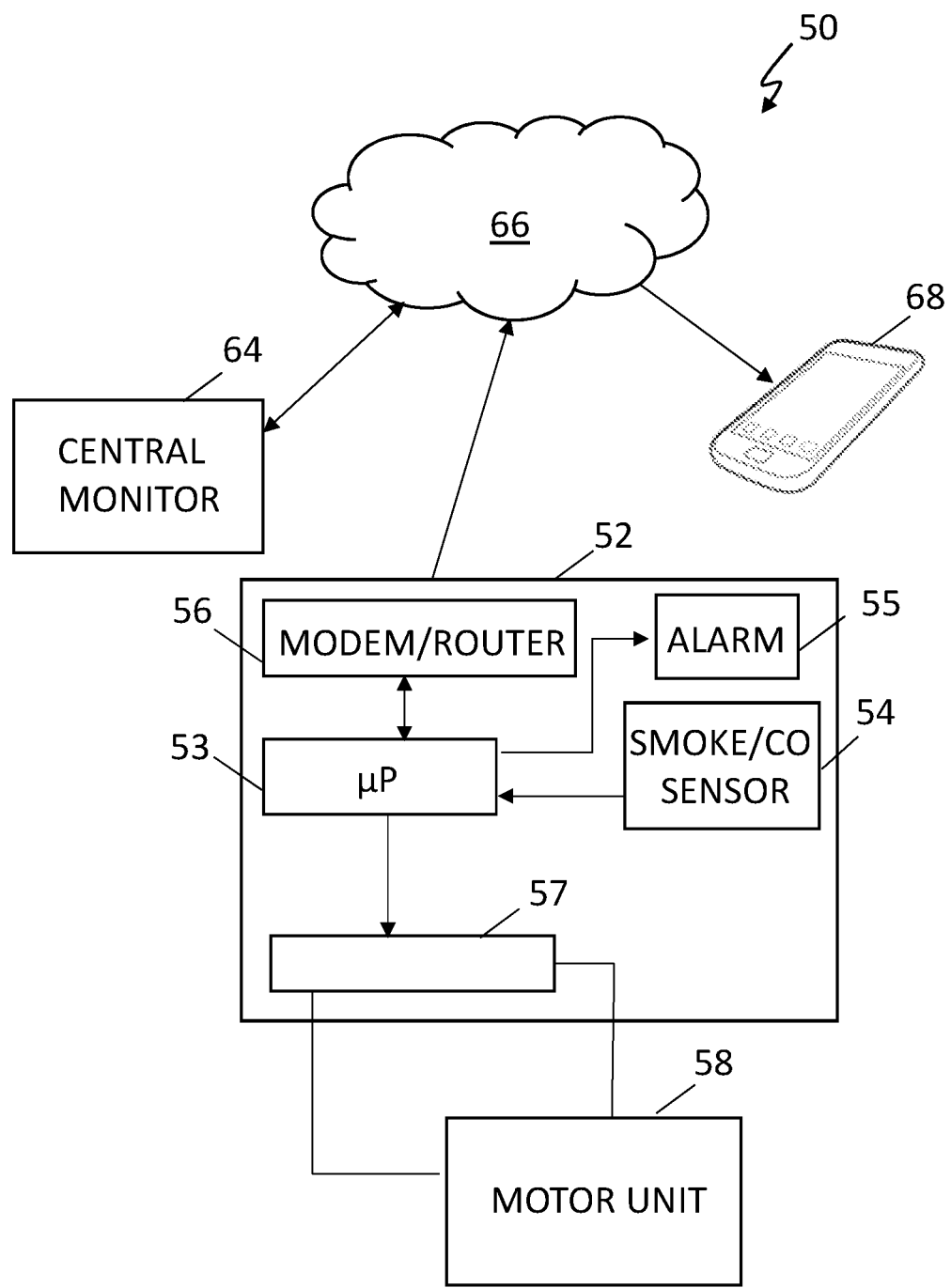
FIG. 7 is a simplified block diagram of another exemplary embodiment of an automatic smoke and carbon monoxide evacuation system according to the teachings of the present disclosure.

FIG. 7 is a simplified block diagram of another exemplary embodiment of an automatic smoke and carbon monoxide evacuation system 50 for a garage according to the teachings of the present disclosure. The system 50 includes a smoke/carbon monoxide activated switch 52 that includes a microprocessor 53 in communication with a smoke/carbon monoxide sensor 54, an audible/visual alarm 55, and a wireless transceiver 56. The smoke/carbon monoxide sensor 54 is preferably co-located or integrated with the safety reverse sensor on one or both sides of the garage door so that the sensors are optimally located to detect exhaust fumes from a source such as a car packed inside the garage. The smoke/carbon monoxide activated switch 52 further includes or is in communication with a power switch 57, which is coupled to the motor unit 58 of the garage door opener. In operation, upon detection of smoke/carbon monoxide, the microprocessor 53 causes the power switch 57 to the motor unit 58 to close and connect to a power source, thus activating the motor unit to open the garage door and keep it open. Once the garage door is open, the microprocessor 53 will temporarily disable the power switch 57 so that subsequent manual manipulation of the wall-mounted switch or remote controller to close the garage door will be ignored as long as the presence of smoke/carbon monoxide is still detected. As in the other embodiments, the microprocessor 53 also generates a signal that causes the audible and/or visible alarms 55 to produce an audible and/or visible alert to inform the occupants of the building. The alert can be a loud sound, siren, flashing lights, etc. that would capture the occupants' attention. The smoke/carbon monoxide activated switch 52 may also include a wireless transceiver (using WiFi, cellular, Bluetooth, Zigbee or another wireless technology) 56 that may send data to a central monitor 64 via the Internet and/or telecommunication network 66 that may then relay the information to fire rescue and emergency response authorities. A mobile phone (or another type of mobile device) 68 with an app may be configured to receive wireless notifications from the central monitor 64 or from the microprocessor 53 directly so that an alert can be communicated to a user via the mobile phone's interfaces (display, speaker, vibrator, etc.) depending on the users' preferences. These notifications provide an added layer of safety alerts to users that may or may not be currently on-site at the time of the emergency.

Accordingly, a smoke/carbon monoxide sensor is incorporated with a garage door opener to enable the automatic opening of the garage door when smoke and/or carbon monoxide is detected in the environment, such as when the engine of a car is left running in the garage and toxic gases are accumulating. The logic programming of the microprocessor 53 enables an override of the manual operation of the switch so that even if a user tries to close the garage door using the wall-mounted switch or remote controller, the garage door would still stay open. Once the garage door is open, the dangerous fumes can be easily evacuated. At the same time, audible and/or visual alarms are set off in addition to alerts sent to a mobile device to notify the occupants of the residence. Notification can also be automatically sent to a central monitor agency or an emergency rescue department. It should be noted that the sensitivity level of the smoke/carbon monoxide sensor is carefully calibrated so that it does not inadvertently trigger false positives and cause the garage door opener to malfunction.

In an implementation for a garage with multiple garage doors, each garage door may be equipped with a smoke/carbon monoxide activated switch to act independently or in a coordinated manner, so that once the sensor of one garage door detects dangerous levels of smoke/carbon monoxide and triggers the opening of one garage door, the other garage door(s) are also retracted regardless of whether the respective smoke/carbon monoxide sensor(s) has detected sufficient levels of the toxic gases.

Figure 8:
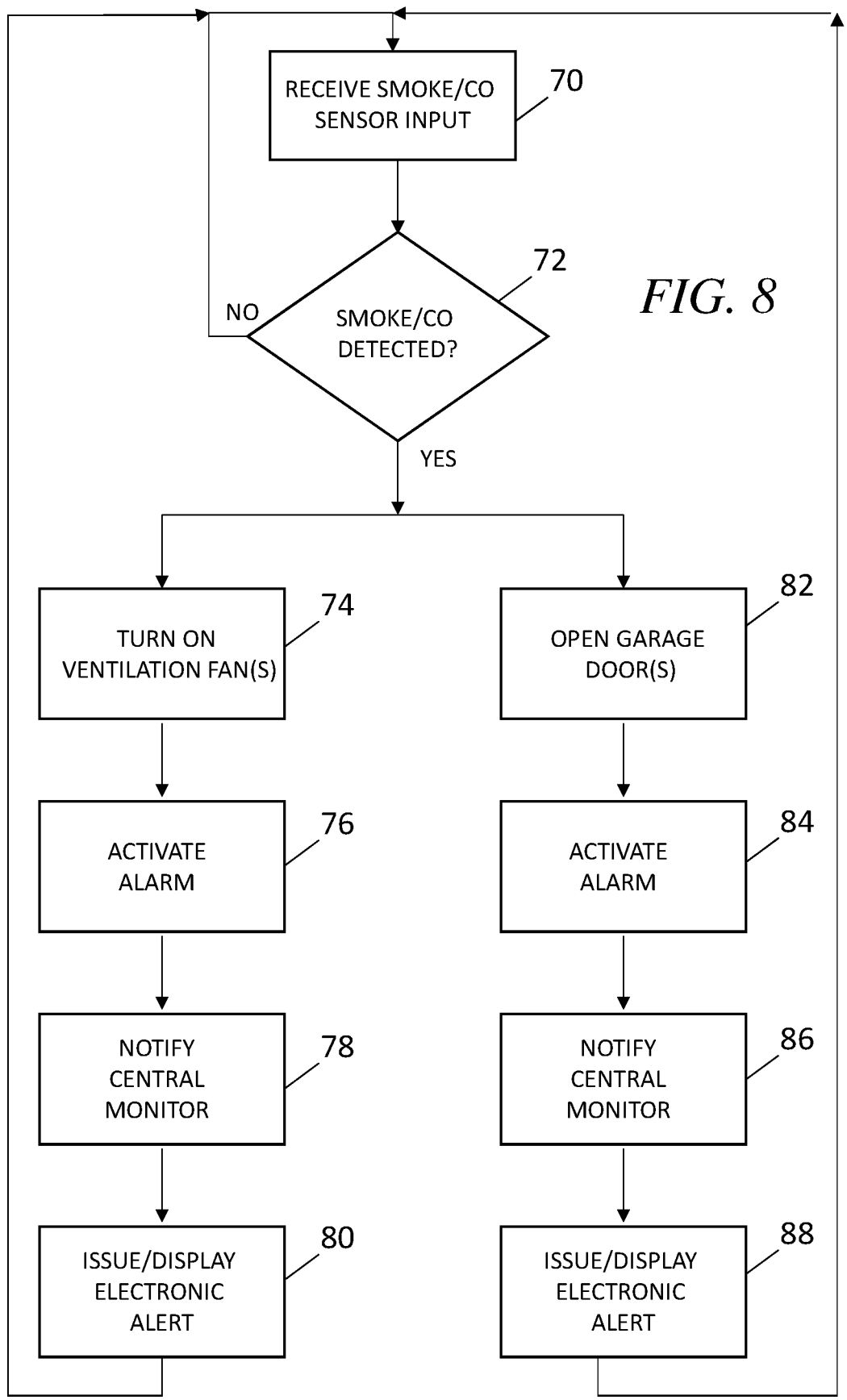
FIG. 8 is a flowchart illustrating an exemplary process of an automatic smoke and carbon monoxide evacuation system according to the teachings of the present disclosure.

FIG. 8 is a flowchart illustrating an exemplary process of an automatic smoke and carbon monoxide evacuation system according to the teachings of the present disclosure. In blocks 70 and 72, the microprocessor of the smoke/carbon monoxide activated switch receives input from the smoke/carbon monoxide sensor and determines whether smoke and/or carbon monoxide has been detected. If not, the process continues to monitor inputs from the smoke/carbon monoxide sensor. If the input from the smoke/carbon monoxide sensor indicates that smoke and/or carbon monoxide is present or approaching a dangerous level, the microprocessor immediately turns on (or increases the fan speed of) one or more ventilation fans so that the deadly gases are forcefully ventilated via existing ductwork, as shown in block 74. Additionally, audible and/or visual alarms are activated to alert occupants of the building, as shown in block 76, and if applicable, a central monitor is notified, as shown in block 78. In block 80, electronic alerts are displayed or issued via a mobile device. The process then loops back to continue to monitor the amount of smoke/carbon monoxide, and to keep the ventilation fan operating if levels are still high.

In the case of the garage door opener embodiment, upon detection of smoke and/or carbon monoxide, the microprocessor activates the motor unit of the garage door opener, and causes one or more garage doors to retract and open, as shown in block 82. Additionally, audible and/or visual alarms are activated to alert occupants of the building, as shown in block 84, and if applicable, a central monitor is notified, as shown in block 86. In block 88, electronic alerts are displayed or issued via a mobile device. The process then loops back to continue to monitor the amount of smoke/carbon monoxide, and to keep the garage door open if levels are still high.

As stated above, a primary goal of the present system and method is to automatically and actively ventilate smoke, carbon monoxide, and/or another harmful substance outside using existing evacuation pathways already present in the building structure to immediately reduce the dangerous level of smoke/carbon monoxide/harmful substance in the environment. This automatic active evacuation scheme can be easily implemented and is cost-effective to retrofit in existing homes and buildings. In all cases, the automatic and active venting of dangerous smoke/carbon monoxide using the present system and method will save countless lives.

The system and method described herein may also incorporate a test button to enable the periodic testing of the functionalities of the smoke/carbon monoxide activated switch. Upon actuating the test button of a smoke/carbon monoxide activated switch, the associated ventilation device(s) is powered up to ensure proper operation. Similarly, the garage door opener embodiment may incorporate a test button that can be used to ensure the proper functioning of the garage door opener.

It should be noted that the power switch component described herein can be thought of as a smart switch or circuit breaker that is "programmed" to direct power to the appropriate target according to whether toxic substances has been detected in the environment. Using this smart power switch or circuit breaker, the ventilation fans and blowers or garage door openers are powered up, turned on, and activated when harmful substances such as smoke, carbon monoxide, or radon are detected to quickly evacuate the deadly gases.

Figure 9:
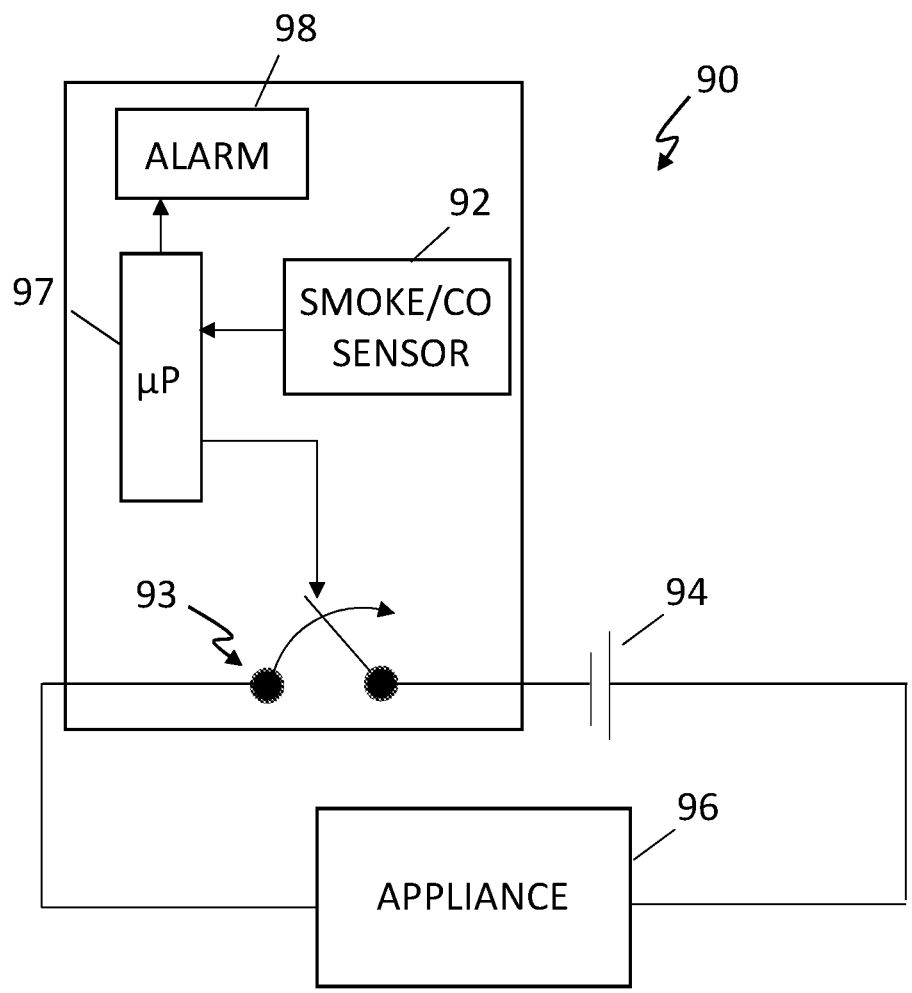
FIG. 9 is a simplified block diagram of an exemplary embodiment of an automatic power cutoff system according to the teachings of the present disclosure.

Referring to FIG. 9, in a further embodiment of the present system 90, the detection of smoke/carbon monoxide/hazardous gases exceeding a predetermined concentration by a sensor 92 may also trigger the automatic cutoff 93 of electrical power 94 to one or more appliances or equipment 96. The sensor 92 generates a signal that is sent to the microprocessor 97 upon detection of smoke/carbon monoxide/hazardous gases, which causes the microprocessor 97 to generate a signal to cause the power switch 93 to open and breaking the power supply circuit to the appliance 96. The power cutoff can occur at the wall switch, power outlet, power cord, and/or circuit breaker and the system 90 can be incorporated into any of these devices. The power cutoff can affect power supplied to one appliance/equipment, one room, one zone in a building, or the entire building triggered upon detection the hazardous gas/substance. Further, the sensor 92 may also activate an alarm 98 that may alert a local user using audio/visual alarms and/or a remote central monitor via the Internet, cellular network, and other wired/wireless communication means.

Figure 10:
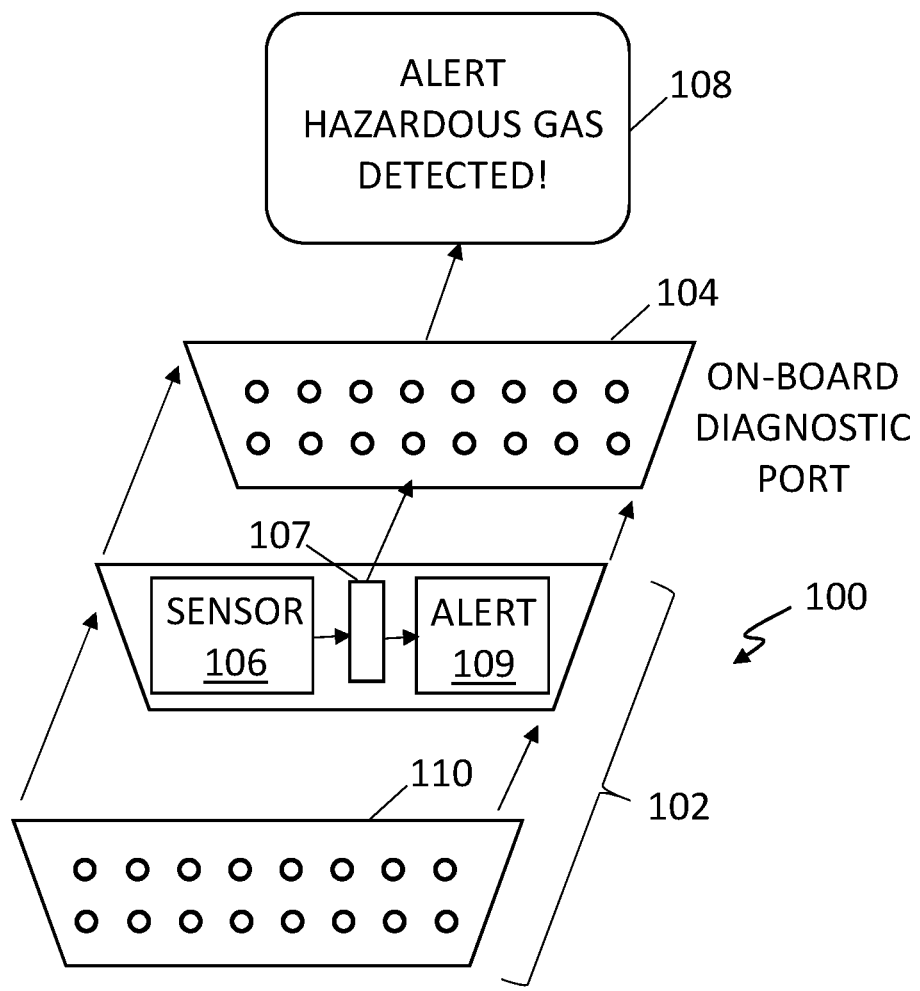
FIG. 10 is a simplified block diagram of an exemplary embodiment of an automatic hazardous gas detection system incorporated in an automotive on-board diagnostics port according to the teachings of the present disclosure.

Referring to FIG. 10, a system incorporates a smoke/carbon monoxide/hazardous gas detection circuit 100 into a housing 102 that can be plugged into and received by an on-board diagnostic (OBD) port 104 (currently a D-shaped 16-pin female connector) of an automotive vehicle. In this embodiment, a sensor 106 can receive its power supply from the OBD port (pin 16) 104. Upon detection of a hazardous gas present in the interior of the vehicle and exceeds a predetermined level, such as carbon monoxide, the sensor 106 automatically sends a signal to a microprocessor 107, which may send an alert message that can be transmitted to a communication network (Ethernet or CAN) coupled to the OBD port 104 that automatically causes an alert text message to be displayed on the dash display 108 or an audible message to be played via the on-board speaker system. Alternatively, the microprocessor may cause an alert device 109 incorporated in the circuit 100 to automatically generate a piercing sound or loud message that informs the driver/passenger that a hazardous gas has been detected and that they should immediately take steps to protect themselves, such as exit the vehicle or open the windows. Because the circuit housing 102 includes a 16-pin D-shaped female connector 110 to enable the connection of vehicle diagnostic tools, the function of the OBD port 104 is not disrupted. Therefore, the housing 102 includes a D-shaped 16-pin male connector for connecting with the OBD port 104, and a D-shaped 16-pin female connector to enable connection to diagnostic tools. In this manner, a smoke/carbon monoxide/hazardous gas detection capability can be easily added to an existing vehicle. Additionally, the system may further include a transceiver configured to automatically transmit a wireless notification message to at least one of a mobile device and a remote central monitoring system.

In another embodiment of the present system, upon detection of a hazardous gas such as carbon monoxide exceeding a predetermined level, the microprocessor 107 automatically generates and transmits an alert signal to an on-board microprocessor (not explicitly shown) of the vehicle. The on-board microprocessor may, upon receiving additional information relating to the operating status of the vehicle, automatically shut off the engine of the vehicle. For example, upon receiving a message that carbon monoxide exceeds a safe level, the on-board microprocessor may additionally determine that the vehicle transmission is currently in park and the vehicle is stationary (0 MPH). Therefore, the on-board microprocessor may determine that the vehicle is in an operating state that its engine may be safely shut off. Accordingly, it is configured to issue a shutoff message to kill the engine so that the further production of carbon monoxide/hazardous gas is halted.

It should be noted that the terms "building" and "structure" may refer to any type of enclosed area or collection of areas in which one or more persons, animals, and/or equipment may occupy. The enclosed area may include a room, basement, garage, home, cabin, cottage, office suite, office building, retail space, warehouse, factory, automobile, truck, tractor trailer, recreational vehicle, boat, ship, etc.

The features of the present invention which are believed to be novel are set forth below with particularity in the appended claims. However, modifications, variations, and changes to the exemplary embodiments of the smoke/carbon monoxide activated sensor system and method described above will be apparent to those skilled in the art, and the system and method described herein thus encompasses such modifications, variations, and changes and are not limited to the specific embodiments described herein.

What is claimed is:

1. An automatic smoke/carbon monoxide/hazardous gas detection system comprising:
   an activation switch configured to couple at least one piece of equipment to an energy source;
   a smoke/carbon monoxide/hazardous gas sensor integrated with the activation switch configured to detect presence of smoke/carbon monoxide/hazardous gas exceeding a predetermined level and automatically generate a trigger signal;
   a microprocessor communicatively coupled to the activation switch and the smoke/carbon monoxide/hazardous gas sensor and configured to generate a shutoff signal in response to receiving the trigger signal from the smoke/carbon monoxide/hazardous gas sensor; and
   the activation switch configured to automatically disconnecting the at least one piece of equipment from the energy source in response to receiving the shutoff signal from the microprocessor, wherein the activation switch is configured to automatically disconnect a vehicle from the energy source in response to receiving the shutoff signal from the microprocessor.

2. The automatic smoke/carbon monoxide/hazardous gas detection system of claim 1, further comprising an alarm device coupled to the microprocessor and configured to generate and issue at least one of audible and visual alarms.

3. The automatic smoke/carbon monoxide/hazardous gas detection system of claim 1, wherein the activation switch is configured to couple and disconnect the electrical power source from at least one of at least one piece of equipment in at least one room of at least one structure.

4. The automatic smoke/carbon monoxide/hazardous gas detection system of claim 1, further comprising a transceiver configured to automatically transmit a wireless notification message to at least one of a mobile device and a remote central monitoring system.

5. An automatic smoke/carbon monoxide/hazardous gas detection method comprising:
   detecting, by a smoke/carbon monoxide/hazardous gas sensor incorporated with an activation switch, presence of smoke/carbon monoxide/hazardous gas exceeding a predetermined level and automatically generating a trigger signal;
   generating, by a microprocessor, a shutoff signal in response to receiving the trigger signal from the smoke/carbon monoxide/hazardous gas sensor; and
   automatically disconnecting at least one piece of equipment a vehicle from an energy source in response to receiving the shutoff signal from the microprocessor.

6. The automatic smoke/carbon monoxide/hazardous gas detection method of claim 5, further comprising automatically generating and issuing at least one of audible and visual alarms in response to receiving the trigger signal.

7. The automatic smoke/carbon monoxide/hazardous gas detection method of claim 5, wherein automatically disconnecting comprises automatically disconnecting the energy source from at least one of at least one piece of equipment in at least one room of at least one structure.

8. The automatic smoke/carbon monoxide/hazardous gas detection method of claim 5, further comprising automatically transmitting a wireless notification message to at least one of a mobile device and a remote central monitoring system.

* * * * *